United States Patent Office 3,393,126
Patented July 16, 1968

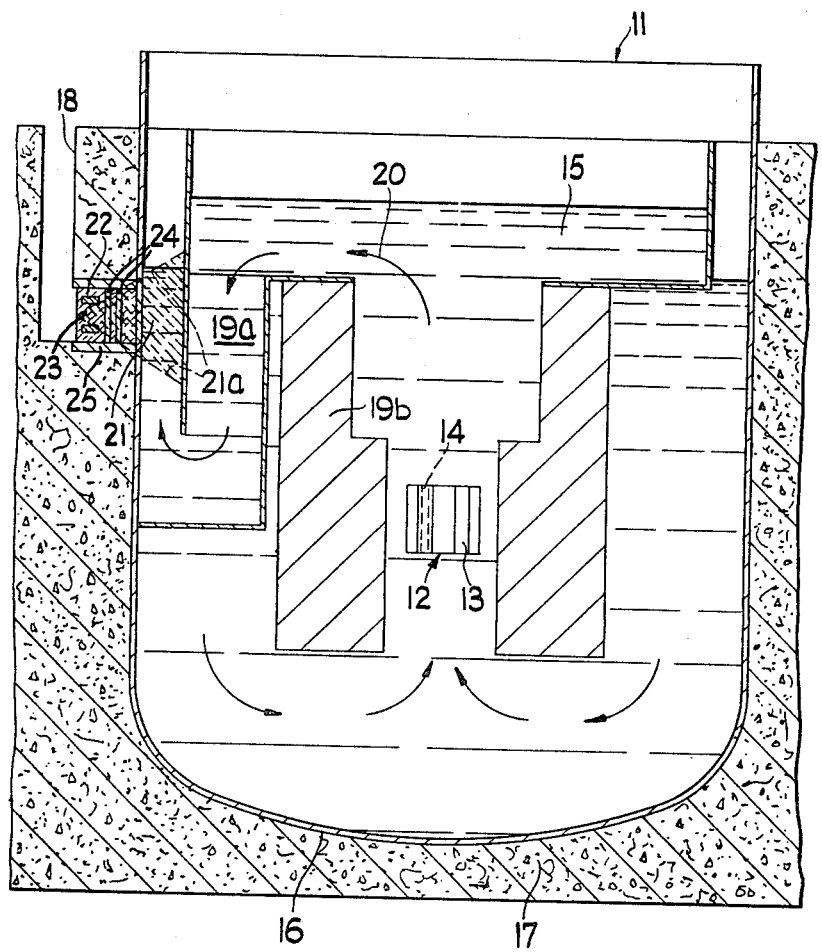

3,393,126
TESTING FOR FUEL ELEMENT SHEATHING
FAILURES IN NUCLEAR REACTORS
Eric John Burton, Halton, Runcorn, David Kendall Cartwright, Overton, Frodsham, and Paul Bernard Francis Evans, Saughall, England, assignors to United Kingdom Atomic Energy Authority, London, England
Filed Nov. 7, 1966, Ser. No. 592,491
6 Claims. (Cl. 176—19)

ABSTRACT OF THE DISCLOSURE

For the detection of fuel element sheathing failure in the core of a nuclear reactor a delayed neutron detector is mounted outside the reactor pressure vessel wall to scan a local region on the inner side of the wall through which region coolant from the core is constrained to flow. The detector is shielded from all radiation save that emitted from the region. The solid angle defining the field of view of the detector of the region is variable by means of filter members interposed between the detector and the vessel.

This invention is concerned with nuclear reactors and with methods and apparatus for testing for the occurrence of fuel sheathing failure.

The control of a nuclear reactor relies on the production of delayed neutrons. These are that small fraction of the total neutrons produced in the fission reaction which appear at an appreciable interval after fission, being emitted in the decay processes of some fission products arising from the original fission. There are several groups of these delayed neutrons and because each group is associated with a particular fission decay process the various groups have distinctive half lives. Furthermore each group contains delayed neutrons of varying energy fractions.

With a reactor running normally the energy spectra of the delayed neutron fractions would have a definite pattern. However decay of fission products arising from leaking fuel elements also gives rise to delayed neutrons which will tend to change the definite pattern. Detection of this change can thus serve as evidence of fuel sheathing failure.

According to the present invention a method of testing for the occurrence of fuel element sheathing failure in a nuclear reactor core contained in a vessel and included in a main coolant circuit, said method comprising the steps of detecting from outside the vessel wall the emission of neutrons from within the vessel and limiting by means of shielding the lateral boundaries of a volume inside the vessel from which the emission of neutrons is detected, this volume being in the main coolant circuit.

According to another aspect of the present invention apparatus for testing for the occurrence of fuel element sheathing failure in a nuclear reactor core contained in a vessel and included in a main coolant circuit, said apparatus comprising neutron monitoring means situated outside the vessel for monitoring the emission of neutrons from within the vessel, filter means adapted to define lateral boundaries of a volume monitored by said monitoring means internally of the vessel, and means forming part of said main coolant circuit to direct the coolant through said volume.

An example of an embodiment of the invention will now be described with reference to the accompanying drawing which is a sectional elevation.

The drawing shows a nuclear reactor 11 having a core 12 with fuel assemblies 13 therein. The assemblies 13 define coolant channels 14 through which liquid sodium coolant 15 can be passed to remove heat generated by fuel elements (not shown) in the channels 14. The core 12 is mounted in a vessel 16 which is surrounded by concrete shielding 17 having in its access channels, typically channel 18, to the outside of the wall of vessel 16. Heat exchanger 19a is mounted in the vessel 16 and removes heat from liquid sodium flowing around neutron shields 19b in the direction indicated by arrows 20. The pumps for maintaining this flow are not shown but are of the impeller type. The heat exchanger 19a serves to define the rear most part of a volume 21 with respect to a ring of neutron monitors 22 embedded in a graphite block 23. The lateral boundaries 21a of the field of view, or "solid angle" of volume 21 are defined by a filter 24 which comprises a series of mild steel plates, and a graphite/cadmium shield 25.

In passing from the outlet of core 12 to the volume 21 (in the direction of arrow 20) the "delayed" neutrons arising from the decay of fission products (notably radioactive bromide and iodine) being younger have experienced much less scattering than the core born neutrons. Thus at volume 21 the spectrum of energies of the delayed neutron is much harder than that of the core-born neutrons. Since these delayed neutrons chiefly arise in the event of fuel sheathing failure the existence of the harder spectrum as detected by monitors 22 indicates sheathing failure in those channels from which the coolant scanned by the monitor comes. The heat exchanger 19a as well as neutron shield 19b serves to shield the monitors 22 from the direct line of core born neutrons. The filter 24 preferentially absorbs core neutrons along flow path 20 and the shield 25 absorbs neutrons born by the interaction of core born gamma radiation with the concrete of shield 17. The overall effect of the filter 24 and shield 25 is to form the "solid angle" or "field of view" defined by the lateral boundaries 21a of the volume 21 scanned by the monitors 22. The addition or removal of plates to the filter 24 and the repositioning of the ring 22 of monitors within the shield 25 allows alteration of the volume 21 within the vessel 16 without any need to reposition components within the vessel.

We claim:

1. A method of testing for the occurrence of fuel element sheathing failure in a nuclear reactor core contained in a vessel having means defining a liquid coolant circuit including a path through the reactor core, said method comprising the steps of: directing at least some of the liquid coolant in the said circuit to a relatively small local region adjacent a wall of the vessel and shielded from direct neutron emission from the core by a shielding member disposed between the region and the core, and detecting, with a detecting means located outside the vessel wall, the neutrons emitted from a portion of said region, between the lateral boundaries of a field of view formed by a solid angle converging from said region towards said detecting means.

2. A method as claimed in claim 1 including the step of adjusting the solid angle forming the field of view of the detector by filter members situated between said detector and said vessel.

3. A method of testing for the occurrence of fuel element sheathing failure in a nuclear reactor core contained in a vessel having means defining a liquid coolant circuit wherein the coolant passes in sequence axially through the reactor core, through a heat exchanger and thereafter along a path adjacent the vessel wall prior to recirculation through the core, said method comprising the steps of detecting from outside the vessel wall neutrons emitted radially from the vessel in a relatively small local region of said flow path adjacent the wall, shielding said region from direct neutron emission from the core by a shielding member disposed between said region and the core, shielding outside the vessel the detector from radiation other than that emitted radially from said region and adjusting the solid angle forming the field of view of the detector by filter members situated between said detector and said vessel.

4. Apparatus for testing for the occurrence of fuel element sheathing failure in a nuclear reactor core, said core being contained in a vessel having means defining a liquid coolant circuit wherein the coolant passes axially through the reactor core, and thereafter along a path adjacent the vessel wall prior to recirculation through the core, said path adjacent the vessel wall having neutron shielding disposed between it and the core to form a region between the shielding and the vessel wall shielded from direct neutron emission from the core, a neutron detector disposed outside the vessel to detect neutrons emitted radially from a relatively small local region of said flow path adjacent the wall, and filter means disposed between the detector and the vessel for defining lateral boundaries of a solid angle defining the field of view of the detector.

5. Apparatus as claimed in claim 4 including shielding means outside the vessel to shield the detector from radiation other than that emitted radially from said region and wherein variation of the filter means permits variation of the solid angle defining the field of view of the detector.

6. Apparatus for testing for the occurrence of fuel element sheathing failure in a nuclear reactor core, said core being contained in a vessel having means defining a liquid coolant circuit wherein the coolant passes in sequence axially through the reactor core, through a heat exchanger and thereafter along a path adjacent the vessel wall prior to recirculation through the core, said path adjacent the vessel wall having neutron shielding disposed between it and the core, comprising a neutron detector disposed outside the vessel to detect neutrons emitted radially from the vessel in a relatively small local region of said flow path adjacent the wall, shielding means outside the vessel to shield the detector from radiation other than that emitted radially from said region and filter means disposed between the detector and said vessel for defining lateral boundaries of a solid angle defining the field of view of the detector, the said filter means including removable plates so that upon addition or removal of said plates, the solid angle defining the field of view of the detector can be varied.

References Cited
UNITED STATES PATENTS

| | | | |
|---|---|---|---|
| 2,719,823 | 10/1955 | Zinn | 176—19 |
| 2,872,400 | 2/1959 | Bugbee et al. | 176—19 |
| 2,911,343 | 11/1959 | Braffort et al. | 176—19 X |
| 3,165,446 | 1/1965 | Untermyer | 176—19 |

REUBEN EPSTEIN, *Primary Examiner.*